United States Patent [19]

Hsieh

[11] Patent Number: 4,763,112

[45] Date of Patent: Aug. 9, 1988

[54] AUTOMATICALLY SELF-ALARMING ELECTRONIC CLINICAL THERMOMETER

[76] Inventor: Fung Hsing Hsieh, No. 83, Lane 174, Gon-Yi Rd., Taichung, Taiwan

[21] Appl. No.: 7,111

[22] Filed: Jan. 27, 1987

[51] Int. Cl.⁴ .............................................. G08B 21/00
[52] U.S. Cl. ..................................... 340/573; 128/736; 340/584; 340/586; 340/596; 340/693; 374/208
[58] Field of Search .............. 340/573, 586, 596, 693, 340/584; 128/736; 374/208, 178, 179, 183, 163

[56]     References Cited
        U.S. PATENT DOCUMENTS 3,274,994  9/1966  Sturm ................................ 128/736
3,494,196  2/1970  Moussette ......................... 340/573
4,090,504  5/1978  Nathan ............................... 128/736

Primary Examiner—Glen R. Swann, III
Attorney, Agent, or Firm—Spencer & Frank

[57]     ABSTRACT

An electronic clinical thermometer is mounted under the armpit by utilizing a lower fastening belt which can be put through under the armpit to connect with the upper fastening belt by using Velcro tape so that the clinical thermometer won't be dropped from the measuring position. We also can set an alarm temperature to monitor the temperature change of the patient at any time.

7 Claims, 3 Drawing Sheets

AUTOMATICALLY SELF-ALARMING ELECTRONIC CLINICAL THERMOMETER

BACKGROUND OF THE INVENTION

In general, there are two kinds of clinical thermometers. One utilizes the expansion and shrinkage effect of mercury and is named the mercurial clinical thermometer; its size is approximately as big as one half of a ballpoint pen. When taking the temperature it is usually put the patient's armpits. Another type of thermometer is the electronic type of clinical thermometer. The way of measurement is just the same as that of the mercurial type. The electronic clinical thermometer uses an electronic sensor to sense the temperature and displays it in digits. There are common disadvantages in the aforesaid two clinical thermometers. First, the patient must be asked to hole the thermometer in position so as to avoid its slipping from the measuring position. Secondly, these clinical thermometers cannot be used for long-time measurements, or for setting an alarm temperature.

SUMMARY OF THE INVENTION

This invention provides an electronic clinical thermometer, especially a thermometer with a self-alarming function. A feature of this iclinical thermometer is that it has a fastening belt to fix it under the armpit when taking the temperature; also, an alarm temperature can be set before measurement. It can automatically send the alarming signal as long as the temperature is over the temperature preset. This thermometer is suitable for a sick child. It can be fixedly mounted under the armpit of the sick child during long-time measurement, and can monitor the change of the temperature of the patient at any time.

DETAILED DESCRIPTION

The main purpose of this invention is to provide an automatically self-alarming electronic clinical thermometer. It has a fastening belt to mount the thermometer under the armpit when measuring the temperature. Even if the patient is sleeping, the clinical thermometer will not slip away from the measuring position.

Another purpose of this invention is to provide an automatically alarming clinical thermometer which can be set to an alarm temperature before measurement by using a setting key and counting key. When the the patient's temperature is over the alarm temperature, the thermometer will send an alarm signal automatically.

The third purpose of this invention is to provide an automatic electronic clinical thermometer which can be fixedly mounted under a patient's armpit by using a fastening belt for a long-time measurement. The temperature change of the patients can be monitored at any time.

Figure 1:
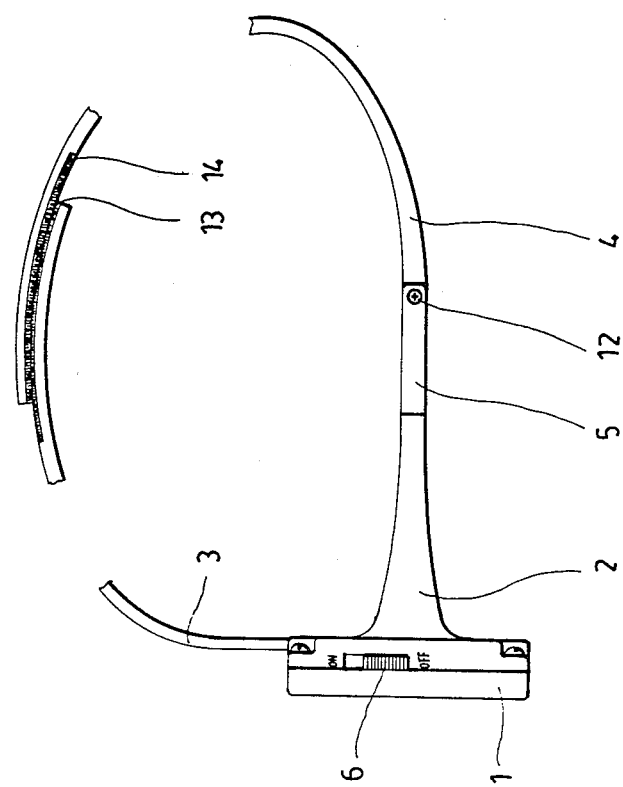
FIG. 1 illustrates a side view of an embodiment of this invention.
Figure 2:
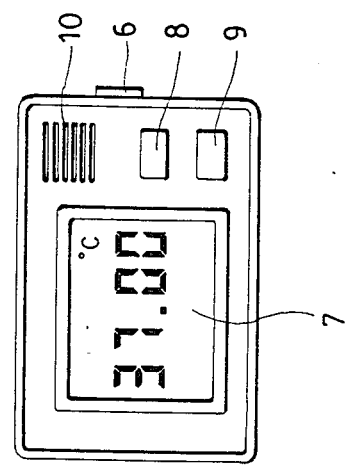
FIG. 2 illustrates a view of the display panel of this invention.
Figure 3:
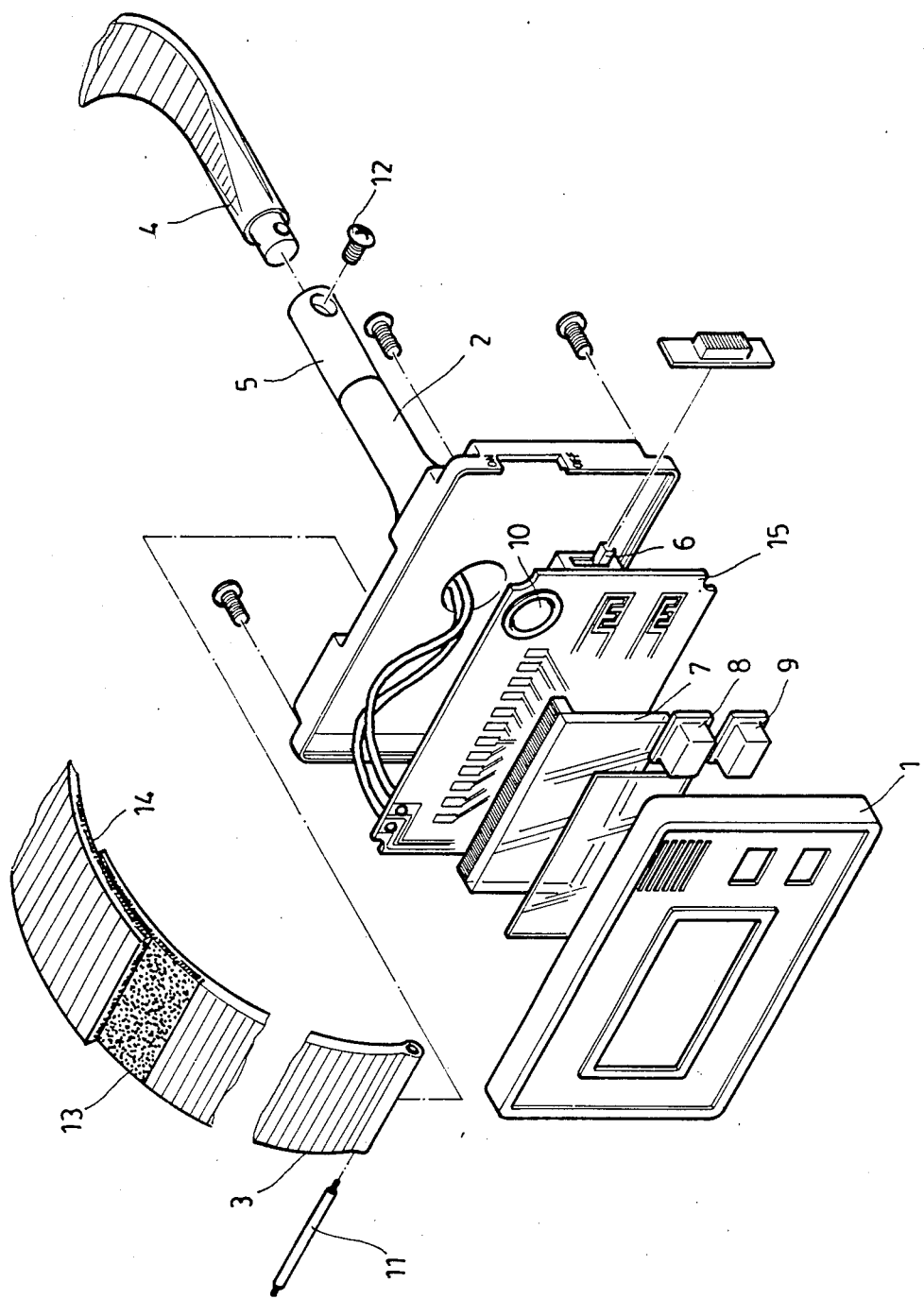
FIG. 3 illustrates an exploded perspective view of this invention, partially broken away.

The present invention is described in detail, with reference to the accompanying drawings, as follows:

FIG. 1 illustrates the side view of the present invention, and FIG. 2 illustrates the display board of the present invention. The structure of this invention comprises an outer case 1, a measuring arm 2, an upper fastening belt 3, and a lower fastening belt 4. The outer case 1 includes a display panel 7 and a circuit board 15 (FIG. 3). FIG. 3 illustrates the disassembled view of the present invention, which includes a power switch 6, a setting key 8, a counting key 9 and an alarm 10. The front end of the measuring arm 2 is formed into a funnel shape, which is fixedly connected with the outer case. The top of the funnel-shaped portion of the measuring arm 2 is furnished with a fixing pin 11 connected with the upper fastening belt 3. In the middle portion of the measuring arm 2, a temperature sensor 5 is provided, and at the end thereof, a screw 12 for fixing the lower fastening belt 4 is furnished. Both the tail ends of the upper fastening belt 3 and lower fastening belt 4 are furnished with Velcro tapes 13 and 14 so as to maintain the clinical thermometer under the armpit.

When measuring temperature, set an alarm temperature is set with the setting key 8 and the counting key 9; then, the lower fastening belt 4 is put through the armpit so as to have the temperature sensor 5 set under the armpit. The lower fastening belt 4 is then pulled back to have the Velcro tapes 13 and 14 fastened together, so that the clinical thermometer will not slip away from the measuring position. Accordingly, the thermometer can be mounted under the armpit for a long time so as to monitor the temperature change of a patient at any time.

Figure 4:
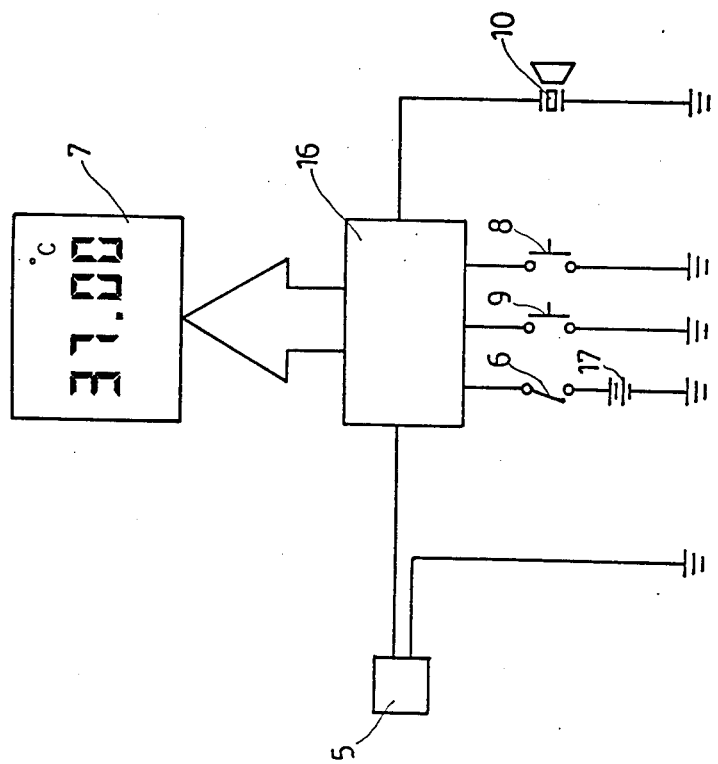
FIG. 4 illustrates the circuit of this invention.

FIG. 4 illustrates an circuit of the embodiment according to the present invention, in which the battery 17 provides the power supply for the embodiment and the switch 6 is used for controlling the power supply. The alarm temperature can be set by means of the setting key 8, the counting key 9 and the display panel 7. After the alarm temperature is set, the temperature sensor 5 is placed at the spot to be tested so as to have the temperature signal sensed coupled to the IC 16, through which the temperature 2ill be shown on the display panel 7. If the temperature sensed is over the alarm temperature which has been set, the IC 16 will instruct the alarm 10 to send out a warning signal.

In conclusion, this invention can be mounted under the armpit with a simple electric circuit and structure to achieve the temperature measuring function.

The description mentioned above is deemed the best mode that the inventor can anticipate during preparing of his invention. Any person who is skilled in the art can make changes and revisions without departing from the spirit of this invention.

What is claimed is:

1. An automatic alarming electronic clinical thermometer comprising:

an outer case including a display panel and a circuit board in the interior of said outer case, a transparent panel in front of the display panel, and an electric power switch, a setting key, a counting key, and an alarm;

an upper fastening belt having first and second ends;

a lower fastening belt having first and second ends;

a fixing pin;

a screw;

a funnel-shaped measuring arm having a front end which is combined with said outer case and having a far end, the fixing pin connecting the first end of the upper fastening belt to the outer case adjacent the front end of the measuring arm and the screw connecting the first end of the lower fastening belt to the far end of the measuring arm;
a temperature sensor mounted on the measuring arm between the front end and far end thereof; and
means for connecting the second ends of the upper and lower fastening belts,
wherein the measuring arm can be fixed under the armpit by using the lower fastening belt and the upper fastening belt to allow sensing of the temperature of the armpit by using the sensor on the measuring arm, the temperature being displayed with the circuit board and the display panel, an alarm temperature being set with the setting key and counting key whereby when the temperature is over the set temperature an alarm signal will be produced.

2. An automatically alarming electronic clinical thermometer as claimed in claim 1 further comprising means for receiving a battery in the outer case for providing operational power, the electric power switch being used for controlling the battery; and an IC mounted on the circuit board, whereby when a temperature is sensed with the temperature sensor, a temperature signal will be generated and coupled to the IC, which will cause the temperature sensed to be displayed on the display panel.

3. An electonic clinical thermometer for monitoring a person, comprising:
a case having a front side with a window, a rear side, and a measuring arm extending from the rear side, the measuring arm having a far end which is remote from the rear side of the case;
a display panel in the case, the display panel being visible through the window;
a temperature sensor in the measuring arm;
strap means for extending around the torso of the person to secure the case to the person with the measuring arm positioned under the armpit of the person, the strap means including a lower fastening belt having first and second ends, the first end of the lower fastening belt being connected to the far end of the measuring arm, the strap means additionally including means for connecting the second end of the lower fastening belt to the case; and
means connected to the sensor for displaying the temperature of the person on the display panel.

4. The thermometer of claim 3, wherein the means for connecting the second end of the lower fastening belt to the case comprises an upper fastening belt having first and second ends, the first end of the upper fastening belt being secured to the case, and a pair of tapes which adhere when pressed together, one tape being attached to the second end of the lower fastening belt and the other tape being attached to the second end of the upper fastening belt.

5. The thermometer of claim 3, further comprising an alarm mounted on the case and at least one manually operable key mounted on the case, and wherein the means connected to the sensor further includes means responsive to the at least one key for setting an alarm temperature, and means for actuating the alarm if the temperature of the person exceeds the alarm temperature.

6. The thermometer of claim 3, further comprising an alarm mounted on the case, and wherein the means connected to the sensor further includes means for actuating the alarm if the temperature of the person exceeds a predetermined temperature.

7. The thermometer of claim 3, wherein the measuring arm is generally funnel-shaped.

* * * * *